United States Patent
Saradhi et al.

(10) Patent No.: US 11,386,044 B2
(45) Date of Patent: Jul. 12, 2022

(54) TIERED STORAGE IN A DISTRIBUTED FILE SYSTEM

(71) Applicant: Hewlett Packard Enterprise Development LP, Houston, TX (US)

(72) Inventors: Uppaluri Vijaya Saradhi, San Jose, CA (US); Arvind Arun Pande, San Jose, CA (US); Kanishk Rastogi, San Jose, CA (US); Giri Prasad Reddy Desireddygari, San Jose, CA (US); Nikhil Bhupale, San Jose, CA (US); Rajesh Boddu, San Jose, CA (US); Chandra Guru Kiran Babu Sanapala, San Jose, CA (US); Premkumar Jonnala, San Jose, CA (US); Ashish Sangwan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 707 days.

(21) Appl. No.: 15/999,199

(22) Filed: Aug. 17, 2018

(65) Prior Publication Data

US 2019/0095458 A1 Mar. 28, 2019

Related U.S. Application Data

(60) Provisional application No. 62/546,272, filed on Aug. 16, 2017.

(51) Int. Cl.
*G06F 16/00* (2019.01)
*G06F 16/13* (2019.01)
(Continued)

(52) U.S. Cl.
CPC .............. *G06F 16/13* (2019.01); *G06F 16/14* (2019.01); *G06F 16/9017* (2019.01); *H04L 67/60* (2022.05)

(58) Field of Classification Search
CPC ...................................................... G06F 16/13
(Continued)

(56) References Cited

U.S. PATENT DOCUMENTS

2007/0113044 A1    5/2007  Day et al.
2008/0263390 A1*  10/2008  Baba ................... G06F 11/1484
                                              714/4.1

(Continued)

OTHER PUBLICATIONS

Search Report and Written Opinion received for PCT Application No. PCT/US2018/000337, dated Dec. 20, 2018, 10 pages.
Hewlett Packard Enterprise Development LP, "QuickSpecs: HPE Data Management Framework," Jul. 17, 2017, document a00016715enw, pp. 1-5, <https://www.hpe.com/psnow/doc/a00016715enw.pdf?jumpid=in_lit-psnow-getpdf&ver=2>.

(Continued)

*Primary Examiner* — Alexandria Y Bromell
(74) *Attorney, Agent, or Firm* — Jaffery Watson Mendonsa & Hamilton

(57) ABSTRACT

A file server receives a request for data from a user device. The data is represented at the file server by a virtual cluster descriptor. The file server queries an identifier map using an identifier of the virtual cluster descriptor. Responsive to the identifier map indicating that the requested data is stored at a location remote from the file server, the file server accesses a cold tier translation table that stores a mapping between an identifier of each of a plurality of virtual cluster descriptors and a storage location of data associated with the respective virtual cluster descriptor. The cold tier translation table is queried using the identifier of the virtual cluster descriptor to identify a storage location of the requested data, and the data is loaded to the file server from the identified storage location.

20 Claims, 5 Drawing Sheets

(51) Int. Cl.
*G06F 16/14* (2019.01)
*G06F 16/901* (2019.01)
*H04L 67/60* (2022.01)

(58) Field of Classification Search
USPC ........................................................ 707/802
See application file for complete search history.

(56) References Cited

U.S. PATENT DOCUMENTS

2009/0119538 A1  5/2009  Scales et al.
2012/0259889 A1  10/2012  Dinker et al.
2016/0041907 A1  2/2016  Jung et al.

OTHER PUBLICATIONS

Silicon Graphics International Corp., "Introduction to DMF," DMF 6 Administrator Guide for SGI® InfiniteStorage™, Version 012, Nov. 2013, Chapter 1, pp. i-ii, 1-58, <https://irix7.com/techpubs/007-5484-012.pdf>.

Silicon Graphics International Corp., "Media-Specific Processes and Library Servers," DMF 6 Administrator Guide for SGI® InfiniteStorage™, Version 012, Nov. 2013, Chapter 13, pp. i-ii, 425-472, <https://irix7.com/techpubs/007-5484-012.pdf>.

Silicon Graphics International Corp., "The DMF Daemon," DMF 6 Administrator Guide for SGI® InfiniteStorage™, Version 012, Nov. 2013, Chapter 11, pp. i-ii, 409-420, <https://irix7.com/techpubs/007-5484-012.pdf>.

* cited by examiner

TIERED STORAGE IN A DISTRIBUTED FILE SYSTEM

CROSS-REFERENCE TO RELATED APPLICATION

This application claims the benefit of U.S. Provisional Application No. 62/546,272, filed Aug. 16, 2017, which is incorporated herein by reference in its entirety.

TECHNICAL FIELD

Various of the disclosed embodiments concern a distributed file system, and more specifically, tiered storage in a distributed file system.

BACKGROUND

Businesses are seeking solutions that meet contradictory requirements of low cost storage, often in off-premise locations, while simultaneously maintaining high speed data access. They also want to have virtually limitless storage capacity. With current approaches, a customer often must buy third party products, such as cloud gateways, that are inefficient and expensive and introduce management and application complexity.

There are some additional considerations that arise in modern big data systems when attempting to transfer cold data to a cold storage tier, where "cold" or "frozen" data is data that is rarely accessed. One particular aspect of many low-cost object stores, such as Amazon S3 or the Azure Object Store, is that it is preferable to have the objects in the object store be relatively large (10 MB or more). It is possible to store much smaller objects, but storage efficiencies, performance, and cost considerations make designs that use larger objects preferable.

For instance, in a modern big data system, there can be a very large number of files. Some of these systems have, for instance, more than a trillion files with file creation rates of more than 2 billion per day, with expectations that these numbers will only continue to grow. In systems with such a large number of files, the average and median file sizes are necessarily much smaller than the desired unit of data written to the cold tier storage. For instance, a system with 1 PB of storage and a trillion files, the average file size is 1018/1012=1 MB, well below the desired object size. Moreover, many systems with large file counts are considerably smaller than a petabyte in total size and have average file sizes of around 100 kB. Amazon's S3 only had two trillion objects, in toto, across all users as recently as 2014. Simply writing a trillion objects into S3 would cost $500,000 due to the transaction costs. For a 100 kB object, the upload costs alone are as much as two months of storage fees. Objects smaller than 128 kB also cost the same as if they were 128 kB in size. These costs structures are reflective of the efficiency of the underlying object store and are the way that Amazon encourages users to have larger objects.

The problem of inefficient cloud storage is further exacerbated by data types beyond traditional files, such as message streams and key value tables. One important characteristic of message streams is that a stream is often a very long-lived object (a lifetime of years is not unreasonable) but updates and accesses are typically made to the stream throughout its life. It may be desirable for a file server to offload part of the stream to a third party cloud service in order to save space, but part of the stream may remain active and therefore frequently accessed by the file server processes. This often means that only small additional pieces of a message stream can be sent to the cold tier at any one time, while a majority of the object remains stored at the file server.

Security is also a key requirement for any system that stores cold data in a cloud service.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

System Overview

A tiered file storage system provides policy-based automated tiering functionality that uses both a file system with full read-write semantics and third party cloud-based object storage as an additional storage tier. The tiered file storage system uses a file server (e.g., operated in-house by a company) in communication with remote, third-party servers to maintain different types of data. In some embodiments, the file server receives a request for data from a user device. The data is represented at the file server by a virtual cluster descriptor. The file server queries an identifier map using an identifier of the virtual cluster descriptor. Responsive to the identifier map indicating that the requested data is stored at a location remote from the file server, the file server accesses a cold tier translation table that stores a mapping between an identifier of each of a plurality of virtual cluster descriptors and a storage location of data associated with the respective virtual cluster descriptor. The cold tier translation table is queried using the identifier of the virtual cluster descriptor to identify a storage location of the requested data, and the data is loaded to the file server from the identified storage location.

Use of the third party storage addresses rapid data growth and improves data center storage resources by using the third party storage as an economical storage tier with massive capacity for "cold" or "frozen" data that is rarely accessed. In this way, valuable on-premise storage resources may be used for more active data and applications, while cold data may be retained at reduced cost and administrative burden. The data structures in the file server enable cold data to be accessed using the same methods as hot data.

Figure 1A:
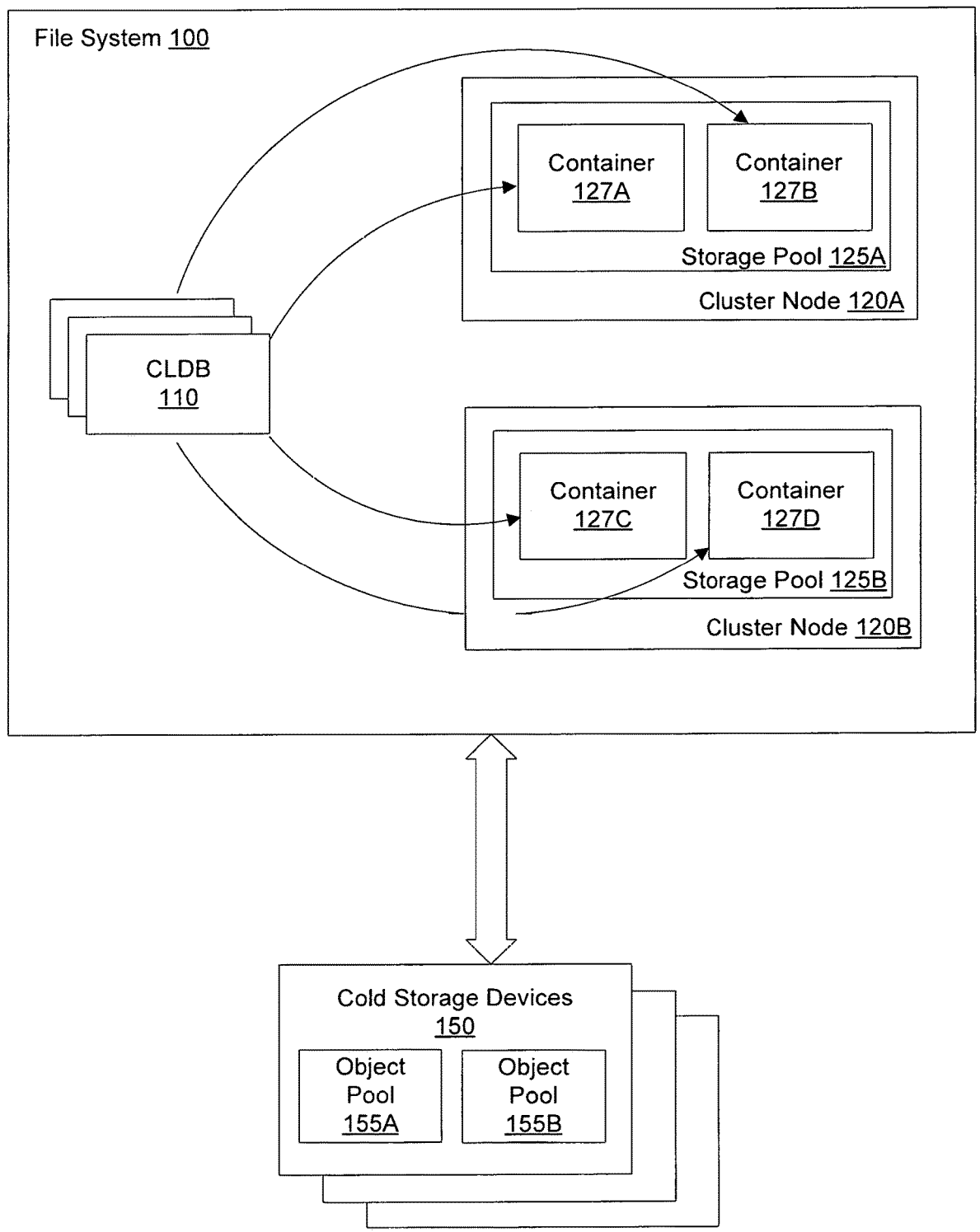
FIG. 1A is a block diagram illustrating an environment for implementing a tiered file storage system, according to one embodiment.

FIG. 1A is a block diagram illustrating an environment for implementing a tiered file storage system, according to one embodiment. As shown in FIG. 1A, the environment can include a file system 100 and one or more cold storage devices 150. The file system 100 can be a distributed file system that supports traditional objects, such as files, directories, and links, as well as first-class objects such as key-value tables and message streams. The cold storage devices 150 can be co-located with storage devices associated with the file system 100, or the cold storage devices 150 can include one or more servers physically remote from the file system 100. For example, the cold storage devices 150 can be cloud storage devices. Data stored by the cold storage devices 150 can be organized into one or more object pools 155, each of which is a logical representation of a set of data.

Data stored by the file system 100 and the cold storage devices 150 is classified into a "hot" tier and a "cold" tier. Generally, "hot" data is data that is determined to be in active use or frequently accessed, while "cold" data is data that is expected to be used or accessed rarely. For example, cold data can include data that must be retained for regulatory or compliance purposes. Storage devices associated with the file system 100 constitute the hot tier, which stores the hot data. Locally storing the hot data at the file system 100 enables the file system 100 to quickly access the hot data when requested, providing fast responses to data requests for lower processing cost than accessing the cold tier. The cold storage devices 150 can store the cold data, and constitute the cold tier. Offloading infrequently used data to the cold tier frees space at the file system 100 for new data. However, recalling data from the cold tier can be significantly more costly and time-intensive than accessing locally-stored data.

Data can be identified as hot or cold based on rules and policies set by an administrator of the file system 100. These rules can include, for example, time since last access, since modification, or since creation. Rules may vary for different data types (e.g., rules applied to a file may be different than the rules applied to a directory). Any new data created within the file system 100 may be initially classified as hot data and written to a local storage device in the file system 100. Once data has been classified as cold, it is offloaded to the cold tier. Reads and writes to cold data may cause partial caching or other temporary storage of the data locally in the file system 100. However, offloaded data may not be reclassified as "hot" absent an administrative action, such as changing a rule applied to the data or recalling an entire volume of data to the file system 100.

The file system 100 maintains data stored across a plurality of cluster nodes 120, each of which includes one or more storage devices. Each cluster node 120 hosts one or more storage pools 125. Within each storage pool 125, data is structured within containers 127. The containers 127 can hold pieces of files, directories, tables, and streams, as well as linkage data representing logical connections between these items. Each container 127 can hold up to a specified amount of data, such as 30 GB, and each container 127 may be fully contained within one of the storage pools 125. The containers 127 can be replicated to another cluster node 120 with one container designated as a master. For example, the container 127A can be a master container for certain data stored therein, and container 127D can store a replica of the data. The containers 127 and logical representation of data provided by the containers may not be visible to end users of the file system 100.

When data is written to a container 127, the data is also written to each container 127 holding a replica of the data before the write is acknowledged. In some embodiments, data to be written to a container 127 are sent first to the master container, which in turn sends the write data to the other replicas. If any replica fails to acknowledge a write within a threshold amount of time and after a designated number of retries, the replica chain for the container 127 can be updated. An epoch counter associated with the container 127 can also be updated. The epoch counter enables each container 127 to verify that data to be written is current and reject stale writes from master containers of previous epochs.

When a storage pool 125 recovers from a transient failure, the containers 127 in the pool 125 may not be far out of date. As such, the file system 100 may apply a grace period after the loss of a container replica is noted before a new replica is created. If the lost replica of a container reappears before the end of the grace period, it can be resynchronized to the current state of the container. Once the replica is updated, the epoch for the container is incremented and the new replica is added to the replication chain for the container.

Within a container 127, data can be segmented into blocks and organized in a data structure such as a b-tree. The data blocks include up to a specified amount of data (such as 8 kB), and can be compressed in groups of a specified number of blocks (e.g., 8). If a group is compressed, the update of a block may entail reading and writing several blocks from the group. If the data is not compressed, each individual block can be directly overwritten.

Data stored in the file system 100 can be represented to end users as volumes. Each volume can include one or more containers 127. When represented to an end user, a volume can have a similar appearance as a directory, but can include additional management capabilities. Each volume can have a mount point defining a location in a namespace where the volume is visible. Operations in the file system 100 to handle cold-tiered data, such as snapshotting, mirroring, and defining data locally within a cluster, can be performed at the volume level.

The file system 100 further includes a container location database (CLDB) 110. The CLDB 110 maintains information about where each container 127 is located and establishes the structure of each replication chain for data stored by the file system 100. The CLDB 110 can be maintained by several redundant servers, and data in the CLDB can itself be stored in containers 127. Accordingly, the CLDB 110 can be replicated in a similar manner to other data in the file system 100, allowing the CLDB to have several hot standbys that can take over in case of a CLDB failure. The designation of a master CLDB 110 can be done using a leader election based on a coordination service. In one embodiment, the coordination service uses Apache Zookeeper, to ensure consistent updates in the presence of node failures or network partitions.

The CLDB 110 can store properties and rules related to tiering services. For example, the CLDB 110 can store rules to selectively identify data to offload to the cold tier and schedules for when to offload data. The CLDB 110 can also store object pool properties to use for storing and accessing offloaded data. For example, the CLDB 110 can store an IP address of the storage device storing offloaded data, authentication credentials to access the storage device, compression level, encryption details, or recommended object sizes.

Collectively, the term "tiering services" is used herein to refer to various independent services that manage different aspects of the data lifecycle for a particular tier-level. These services are configured in the CLDB 110 for each tier-level enabled on each volume. The CLDB 110 manages discovery, availability, and some global state of these services. The CLDB 110 can also manage any volumes required by these services to store their private data (e.g., meta-data for the tier-level services) and any service specific configurations, such as which hosts these services can run on. In the case of cold-tiering using object pools 155, the tiering services can also function as the gateway to the object pool 155 via specific hosts in the cluster because not all hosts may have access to the cold storage devices 150.

Figure 1B:
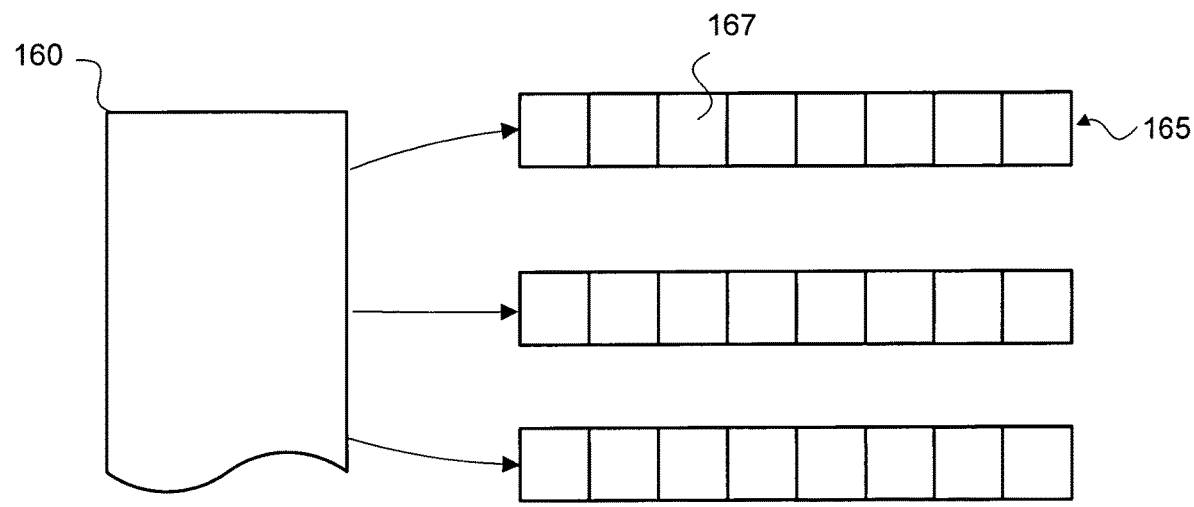
FIG. 1B is a schematic diagram illustrating logical organizations of data in the file system.

As described above, data is stored in the file system 100 and cold storage devices 150 in blocks. FIG. 1B is a schematic diagram illustrating logical organizations of data in the file system 100. As shown in FIG. 1B, data blocks 167 can be logically grouped into virtual cluster descriptors (VCDs) 165. For example, each VCD 165 can contain up to eight data blocks. One or more VCDs 165 can together represent data in a discrete data object stored by the file system 100, such as a file. The VCD 165 representation creates a layer of indirection between underlying physical storage of data and higher-level operations in the tiered storage system that create, read, write, modify, and delete data. For example, these higher-level operations can include read, write, snapshot creation, replication, resynchronization, and mirroring. The indirection enables these operations to continue to work with the VCD abstraction without requiring them to know how or where the data belonging to the VCD is physically stored. In some embodiments, the abstraction may only apply to substantive data stored in the tiered storage system; file system metadata (such as namespace metadata, inode lists, and fidmap) may be persistently stored at the file server 100 and, accordingly, the file system 100 may not benefit from abstracting the location of the metadata. However, in other cases, the file metadata can also be represented by VCDs.

Each VCD 165 is assigned a unique identifier (referred to herein as a VCDID). The file system 100 maintains one or more maps 160 (referred to herein as a VCDID map) storing the physical location of data associated with each VCDID. For example, each container 127 can have a corresponding VCDID map 160. In the trivial case, when data has not yet been offloaded to an object pool 155, the VCDID map 160 can be a one-to-one mapping from a plurality of VCDIDs 165 to physical block addresses where the data associated with each VCDID is stored. Accordingly, when data is stored locally at the file server 100, the file server 100 can query a VCDID map 160 using a VCDID to identify the physical location of data. Once data has been offloaded to an object pool, the VCDID map 160 may be empty or otherwise indicate that the data has been offloaded from the file system 100.

Generally, when the file system 100 receives a request associated with stored data (e.g., a read request or a write request), the file system 100 checks the VCDID map 160 for a VCDID associated with the requested data. If the VCDID map 160 lists a physical block address for the requested data, the file system 100 can access the data using the listed address and satisfy the data request directly. If the entry is empty or the VCDID map 160 otherwise indicates that the data has been offloaded, the file system 100 can query a sequence of cold tier services to find the data associated with the VCDID. The cold tier services can be arranged in a priority order so that erasure coding can be preferred to cloud storage, for example. Using a prioritized search of tiering services also allows data to be available in multiple tiers (e.g., a hot tier and a cold tier), which simplifies a process for moving data between tiers.

Using and maintaining the VCDID map may impact data retrieval performance of the file system 100 in two primary ways. First, querying the VCDID map to find local locations for the data in a VCD creates an extra lookup step, beyond for example consulting a file b-tree. This extra lookup step has a cost to the file system 100, largely caused by the cost to load a cache of the VCDID map entries. However, the ratio of the size of the actual data in a container to the VCDID map itself is large enough that the cost to load the map is small on an amortized basis. Additionally, the ability to selectively enable tiering for some volumes and not for others allows volumes with short-lived, very hot data to entirely avoid this cost.

The second type of performance impact is caused by interference between background file system operations and foreground I/O operations. In particular, insertions into the VCDID map as data is moved can cost time and processing resources of the file system 100. In some embodiments, the cost of inserts can be reduced by using a technique similar to a Log-Structured-Merge (LSM) tree. As a cleaning process moves data, the cleaner appends new entries to a log file and writes them to an in-memory data structure. When enough entries in the log have been collected, these entries can be sorted and merged with the b-tree, thus incurring a lower amortized cost than that of doing individual insertions. The merge can be done with little conflict with the main I/O path because mutations to the b-tree containing the VCDID-map can be forced into the append-only log, thus delaying any actual mutations until the merge step. The merge of the b-tree with the append-only logs can be done by a compaction process. Although these merge steps consume processing resources of the file system 100, moving these operations out of the critical I/O path lessens the impact on the performance of the file system 100.

Offloading Data to a Cold Tier

Data operations in the tiered file system can be configured at the volume level. These operations can include, for example, replication and mirroring of data within the file system 100, as well as tiering services such as cold-tiering using object pools 155. It is possible for the administrator to configure different tiering services on the same volume, just as multiple mirrors can be defined independently.

From the perspective of a user, a file looks like the smallest logical unit of user data that is identified for offload to the cold-tier because offloading rules that are defined for a volume refer to file-level properties. However, offloading data on a per-file basis has the drawback that snapshots share unmodified data at a physical block level in the file system 100. Thus, the same file across snapshots can share many blocks with each other. Offloading at the file level would accordingly result in duplication of shared data in a file for each snapshot. Snapshots at the VCD level, however, can leverage the shared data to save space.

Figure 2A:
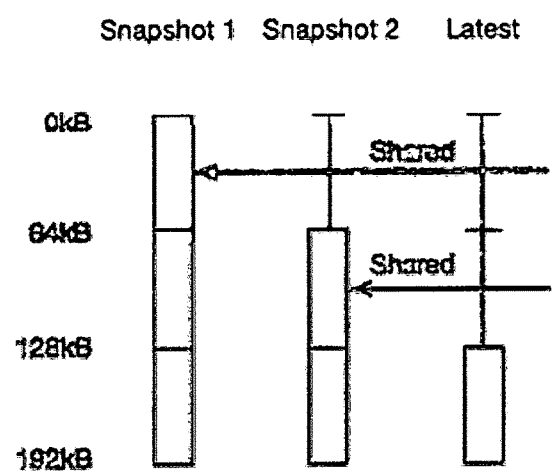
FIG. 2A illustrates an example of snapshots of a volume of data.

FIG. 2A illustrates an example of snapshots of a volume of data. In FIG. 2A, data blocks in a file are shared between snapshots and the latest writable view of the data. The example file undergoes the following sequence of events:
1. The first 192 kB of the file (represented by three VCDs) are written,
2. snapshot S1 is created
3. the last 128 kB of the file (represented by two VCDs) is overwritten
4. snapshot S2 is created
5. The last 64 kB of the file (represented by one VCD) is overwritten If the blocks in snapshot S1 are moved to the cold storage device 150, tiering at the VCD level would allow snapshot S2 and the current version of the file to share the tiered data with snapshot S1. Conversely, offloading at the file level would not leverage the possible space saving of shared blocks. This wasted storage space can have significant impacts on the efficiency of and cost to maintain data in the cold tier, especially with long lasting snapshots or large number of snapshots.

As shown in FIG. 2A, data blocks in a file are shared between snapshots and the latest writable view of the data. When blocks of data are overwritten, the new blocks shadow the blocks in older snapshots, but are shared with newer views. Here, the block starting at offset 0 has never been overwritten, the blocks starting at 64 k and 128 k were overwritten before snapshot 2 was taken, and the block at 128 k has been overwritten again at some time after snapshot 2.

If the data represented in FIG. 2A were offloaded at the file level, the whole file must be either "hot" (available on local storage) or "cold" (stored in the object-pool), and remote I/O to file would be much harder to manage in partial chunks. Since some data types, such as message streams, can have both very hot and very cold data in the same object, determining whether the entire object should be stored locally or at the cold tier is inefficient. Tiering at the cluster descriptor level, in contrast, enables the file system 100 to more efficiently classify data. For example, with respect to the data blocks in FIG. 2A, all of the blocks in snapshots 1 and 2 can be considered cold while the file system 100 retains the unique block of the latest version as hot data.

Figure 2B:
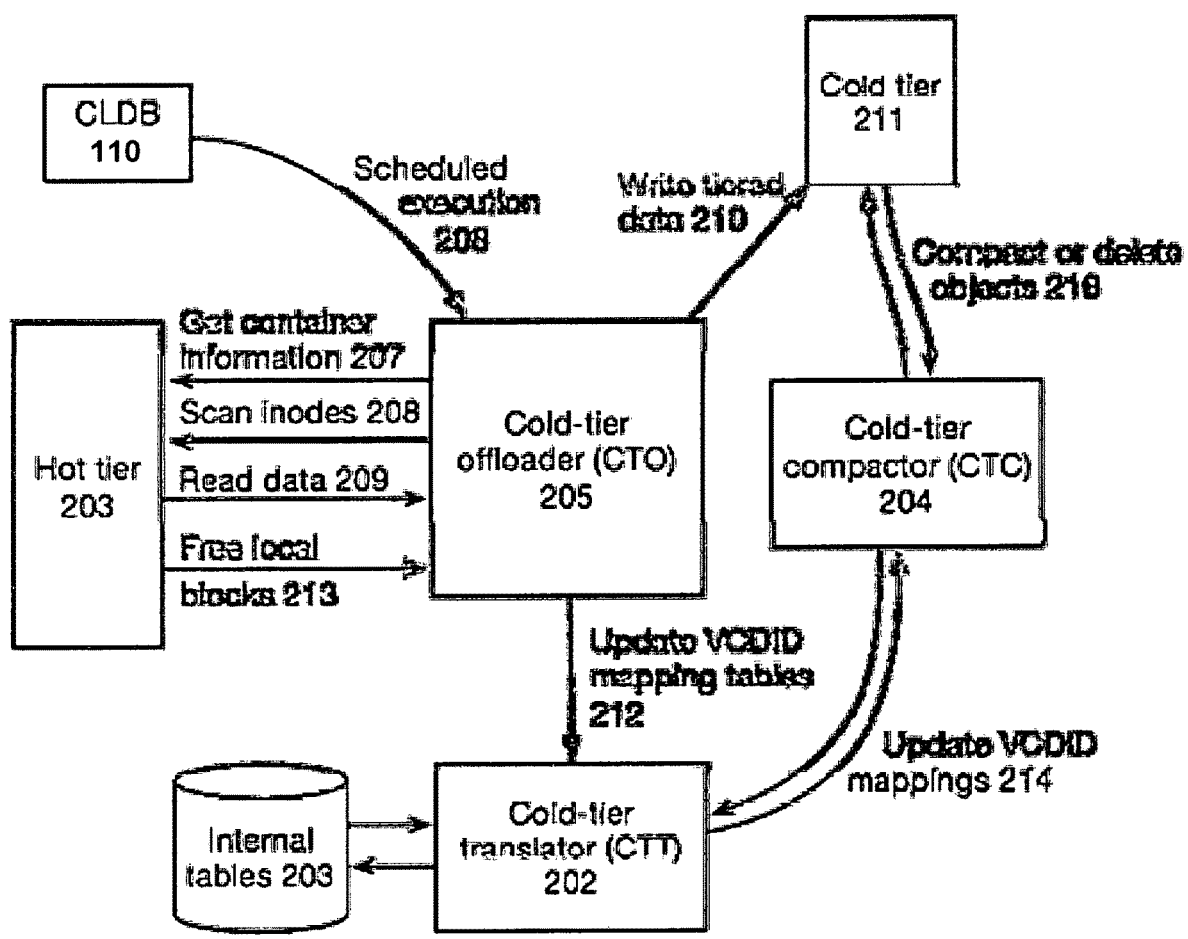
FIG. 2B is a block diagram illustrating processes for offloading data to a cold tier.

FIG. 2B is a block diagram illustrating processes for offloading data to a cold tier. As shown in FIG. 2B, the processes can include a cold-tier translator 202, a cold-tier offloader 205, and a cold-tier compactor 204. Each of the cold-tier translator 202, cold-tier offloader 205, and cold-tier compactor 204 can be executed by one or more processors of the file system 100, and can be configured as software modules, hardware modules, or a combination of software and hardware. Alternatively, each of the processes can be executed by a computing device different from the file system 100, but can be called by the file system 100.

The cold-tier translator (CTT) 202 fetches data from the object pool 155 associated with a given VCDID. To achieve this, the CTT 202 maintains internal database tables 203 that translate VCDIDs into a location of a corresponding VCD, where the location is returned as an object identifier and offset. It also can store any required information to validate the data fetched from the object pool 155 (e.g., a hash or checksum), to decompress the data in case the compression level is different between object pool 155 and the file system 100, and to decrypt the data in case encryption is enabled. When data is offloaded to the object pool 155, the CTT tables 203 can be updated with an entry for the VCDIDs corresponding to the offloaded data. The CTT 202 can also update the tables 203 after any reconfiguration of the objects in the object pool 155. One example object reconfiguration is compaction of the object pool 155 by the cold-tier compactor 204, described below. The CTT 202 can be a persistent process, and as each container process can know the location of the CTT 202, the file system 100 can request data for any VCDIDs at any time. To know where a CTT process is running, the file system 100 can store contact information, such as IP address and port number, in the CLDB 110. Alternatively, the file system 100 can store the contact information of the CTT 202 after being contacted by it. Yet another alternative is for the filesystem process to keep any connection with the CTT 202 alive after the connection has been opened by either the CTT 202 or the filesystem process.

The cold-tier offloader (CTO) 205 identifies files in the volume that are ready to be offloaded, fetches data corresponding to these files from the file system 100, and packs this data into objects to be written into an object pool 155. The CTO 205 process can be launched according to a defined schedule, which can be configured in the CLDB 110. To identify files to offload, the CTO 205 can fetch information 207 about which containers 127 are in a volume, then fetch 208 lists of inodes and attributes from the file system 100 for these containers. The CTO 205 can apply the volume-specific tiering rules on this information, and identify files or portions of files which meet the requirements for moving to a new tier. Data so identified can comprise a number of page clusters (e.g., in 64 kB increments) belonging to many files. These page clusters can be read 209 and packed together to form an object for tiering, which for example can be 8 MB or more in size. While packing data into the objects, the CTO 205 computes validation data (such as a hash or checksum) that can be used later for consistency checking, compresses the data if required, and also encrypts the data if required. The resulting object is written 210 to the cold tier 211 (e.g., sent to a cold storage device 150 for storage). The CTO ensures 212 that the VCDID mappings are updated in the internal CTT tables 203 before notifying 213 the file system 100 to mark the VCDID as offloaded in its local VCDID-map.

The cold-tier compactor (CTC) 204 identifies delete VCDIDs and removes them from the CTT tables 203. Operations such as file delete, snapshot delete, and over writing existing data can cause the logical removal of data in the file system 100. Ultimately, these operations translate into deletions of VCDIDs from the VCDID-maps. To remove deleted VCDIDs, the CTC 204 examines 214 the VCDID-map to find opportunities to entirely delete or to compact 215 objects stored in the cold pools. Further, the CTC 204 service can also track invalid data in objects residing on the object pool and delete objects that have become invalid over time, freeing space in the object-pool. However, random deletions can cause fragmentation of data leading to unused space in the objects in the object-pool. Accordingly, the CTC service 204 may remove deleted objects while maintaining an amount of unused space to be less than a threshold. This service can also retrieve space from such defragmented objects by compacting objects with large unused space into new objects and updating mappings in the CTT 202. The CTC 204 may run at scheduled intervals, which can be configured the CLDB 110.

The compactor process performed by the CTC 204 can proceed safely even in the face of updates to data in the filesystem. Because the VCDID-map and each cold pool are probed in sequence, adding a reference in the VCDID-map for a particular block can make any changes in downstream tiering structures irrelevant. Thus, the CTC 204 can change the tiering structure before or after changing the VCDID-map, without affecting a user's view of the state of the data. Furthermore, because tiered copies of data can be immutable and references inside any data block to another data block ultimately are mapped through the VCDID-map, the data can be cleanly updated without implementation of checks such as distributed locks.

Each of the CTT 202, CTO 205, and CTC 204 can serve multiple volumes because internal metadata is separated at a per-volume level. In some embodiments, the CLDB 201 can ensure that there is only one service of each type active for a given volume at a given time. The CLDB 201 can also stop or restart services based on cluster state and heartbeats received from these services, ensuring high availability of the tiering services.

Sample Operations on Tiered Data

Figure 3:
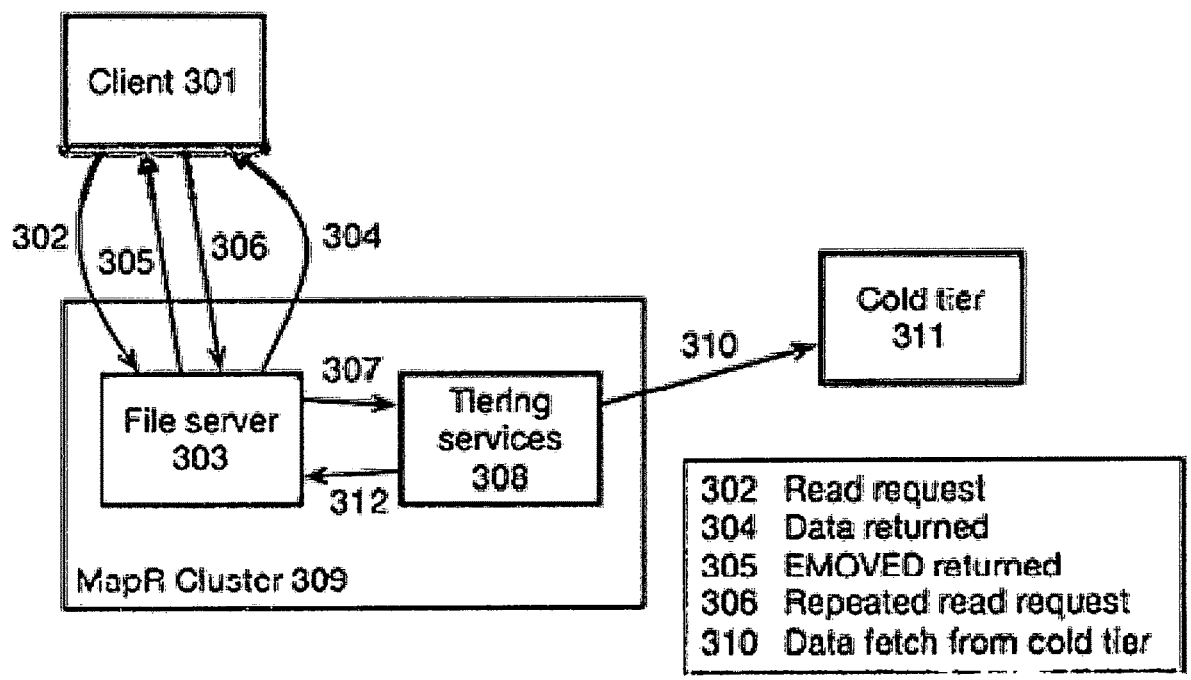
FIG. 3 is a block diagram illustrating elements and communication paths in a read operation in a tiered filesystem, according to one embodiment.

FIG. 3 is a block diagram illustrating elements and communication paths in a read operation in a tiered filesystem, according to one embodiment. Components and processes described with respect to FIG. 3 may be similar to those described with respect to FIGS. 1 and 2B.

As shown in FIG. 3, a client 301 sends 302 a read request to a file server 303. The read request identifies data requested by the client 301, for example for use in an application executed by the client 301. The file server 303 can contain a mutable container or an immutable replica of desired data. Each container or replica is associated with a set of directory information and file data, stored for example in a b-tree.

The file server 303 can check the b-tree to find the VCDID corresponding to the requested data, and checks the VCDID-map to identify the location of the VCDID. If the VCDID-map identifies a list of one or more physical block addresses where the data is stored, the file server 303 reads the data from the location indicated by the physical block addresses, stores the data in a local cache, and sends 304 a response to the client 301. If the VCDID-map indicates that the data is not stored locally (e.g., if the map is empty for the given VCDID), the file server 303 identifies an object pool to which the data has been offloaded.

Because retrieving the data from the object pool may take more time than reading the data from disk, the file server 303 can send 305 an error message (EMOVED) to the client 301. In response to the error message, the client 301 may delay a subsequent read operation 306 by a preset interval of time. In some embodiments, the client 301 may repeat the read operation 306 a specified number of times. If the client 301 is unable to read the data from the file server 303 cache after the specified number of attempts, the client 301 may return an error message to the application and make no further attempts to read the data. The amount of time between read attempts may be the same, or may progressively increase after each failed attempt.

After sending the EMOVED error message to the client 301, the file server 303 can begin the process of recalling data from the cold tier. The file server 303 can send 307 a request to the CTT 308 with a list of one or more VCDIDs corresponding to the requested data.

The CTT 308 queries its translation tables for each of the one or more VCDIDs. The translation tables can contain a mapping from the VCDIDs to object ID and offsets identifying the location of the corresponding data. Using the object ID and offset, the CTT 308 fetches 310 the data from the cold tier 311. The CTT 308 validates returned data against an expected value and, if the expected and actual validation data match, the data is returned 312 to the file server 303. If the stored data was compressed or encrypted, the CTT 308 may decompress or decrypt the data before returning 312 the data to the file server 303.

When the file server 303 receives the data from the CTT 308, the file server 303 stores the received data in a local cache. If a subsequent read request 306 is received from the client 301, the file server 303 returns 304 the desired data from the cache.

FIG. 3 provides a general outline of elements and communication paths in a read operation. Read operations may be satisfied quickly if data is stored locally on the file server 303. If the data is not stored locally, the file server 303 can return an error message to the client 301, causing the client to repeatedly re-request the data while the file server 303 asynchronously fetches the desired data. This style of read avoids long requests from the client. Instead, the client repeats requests until it reaches a specified number of failed attempts or receives the desired data. Because the client 301 repeats the data requests, the file server 303 does not need to retain information about the client's state while retrieving data from the cold tier. Using the process described with respect to FIG. 3, many requests from the client can be satisfied quickly. This can decrease the number of pending requests on the server side, as well as decrease the impact of a file server crash. Because there are typically many clients making requests to each file server, putting more state on the client side means that more state survives a file server crash so operations can resume more quickly.

Figure 4:
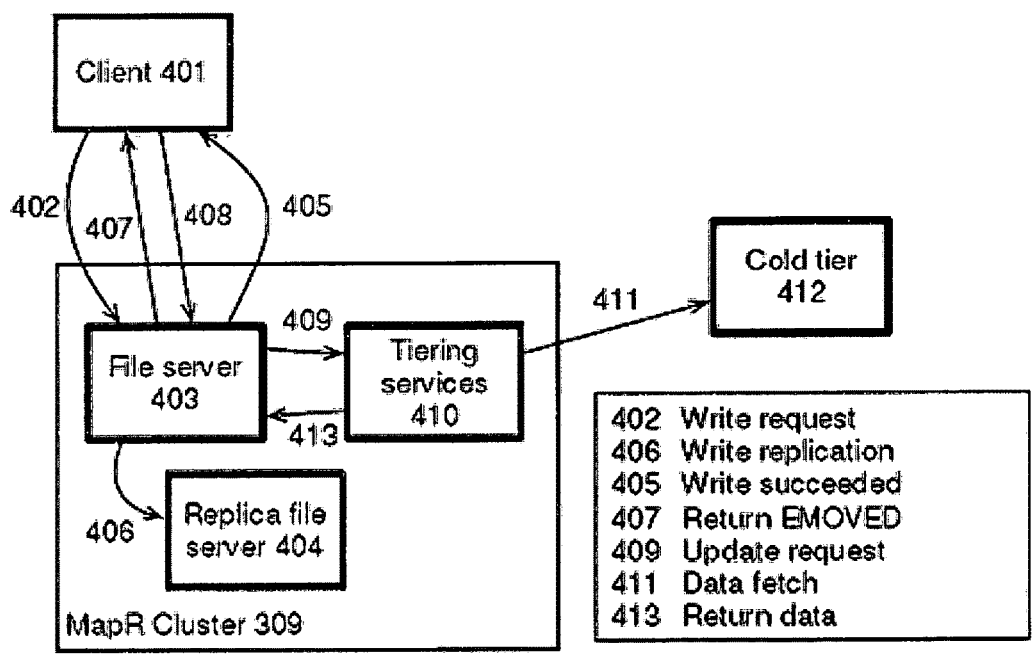
FIG. 4 is a block diagram illustrating elements and communication paths in a write operation in a tiered filesystem, according to one embodiment.

FIG. 4 is a block diagram illustrating elements and communication paths in a write operation in a tiered filesystem, according to one embodiment. Components and processes described with respect to FIG. 4 may be similar to those described with respect to FIGS. 1, 2B, and 3.

As shown in FIG. 4, a file client 401 sends 402 a write request to the file server 403. The write request includes a modification to data that is stored by the file server 403 or a remote storage device, such as changing a portion of the stored data or adding to the stored data. The data to be modified may be replicated across multiple storage devices. For example, the data may be stored on both the file server 403 and one or more remote storage devices, or the data may be stored on multiple remote storage devices.

When the file server 403 receives the write request from the client 401, the file server 303 can allocate a new VCDID to the newly written data. The new data can be sent to any other storage devices 404 that maintain replicas of the data to be modified, enabling the other servers 404 to update the replicas.

The file server 403 can check the b-tree to retrieve the VCDID of the data to be modified. Using the retrieved VCDID, the file server 403 can access metadata for the VCD from the VCDID map. If the metadata contains a list of one or more physical block addresses identifying a location of the data to be modified, the file server 403 can read the data from the locations identified by the addresses and write the data to a local cache. The file server 403 can modify the data in the cache according to the instructions in the write request. The write operations can also be sent 406 to all devices storing the replicas of the data. Once the original data and replicas have been updated, the file server 403 can send 405 a response to the client 401 that indicates that the write operation completed successfully.

If the metadata does not identify physical block addresses for the data to be modified (e.g., if the map is empty for the given VCDID), the file server 403 identifies an object pool to which the data has been offloaded. Because retrieving the data from the object pool may take more time than reading the data from disk, the file server 403 can send 407 an error message (EMOVED) to the client 401. In response to the error message, the client 401 may delay a subsequent write operation 408 by a preset interval of time. In some embodiments, the client 401 may repeat the write operation 408 a specified number of times. If the write operation fails after the specified number of attempts, the client 401 may return an error message to the application and may no further attempts to write the data. The amount of time between write attempts may be the same, or may progressively increase after each failed attempt.

After sending the EMOVED error message to the client 401, the file server 403 can begin the process of recalling data from the cold tier to update the data. The file server 403 can send a request 409 to the CTT 410 with a list of one or more VCDIDs corresponding to the data to be modified.

The CTT 410 searches its translation tables for the one or more VCDIDs and, using object ID and offset output by the translation tables, fetches 411 the data from the cold tire 412. The CTT 410 validates the returned data against an expected value and, if the expected and actual validation data match, the data is returned 413 to the file server 403. If the stored data was compressed or encrypted, the CTT 410 may decompress or decrypt the data before returning 413 the data to the file server 403.

When the file server 403 receives the data from the CTT 410, the file server 403 replicates 406 the unchanged data to any replicas, and writes the data to a local cache using the same VCDID (converting the data back into hot data). If a subsequent write request is received from the client 401, the file server 403 can perform an overwrite of the recalled data to update the data according to the instructions in the write request.

According to the process described with respect to FIG. 4, the flow of data is the same whether the data is stored locally at the file server 403 or has been offloaded to the cold tier. Because the write data is sent to the replicas before the b-tree is checked to determine the location of the data to be modified, the replicas may need to discard the write data if the data to be modified has been offloaded. However, even though this process results in replicating data that is later discarded, the replicated data is only discarded in the case that the data has been offloaded, and the file server 403 does not need to use different processes for hot tier storage and cold tier storage of the data. In other embodiments, though, the steps of the process described with respect to FIG. 4 may be performed in different orders. For example, the file server 403 may check the b-tree to identify the location of the data before sending the write request to the replicas.

Cold tier data storage using object pools enables a new option to create read-only mirrors for disaster recovery (referred to herein as DR-mirrors). The object pool is often hosted by a cloud server provider, and therefore stored on servers that are physically remote from the file server. A volume that has been offloaded to the cold tier may contain only metadata, and together with the metadata stored in the volume used by the cold tiering service, the offloaded data constitutes a small fraction (e.g., less than 5%) of the actual storage space used by the volume. An inexpensive DR-mirror can be constructed by mirroring the user volume and the volume used by the cold tiering service to a location remote from the file server (and therefore likely to be outside a disaster zone affecting the file server). For recovery, a new set of cold tiering services can be instantiated that enable the DR-mirror to have read-only access to a nearly consistent copy of the user volume.

Computer System

Figure 5:
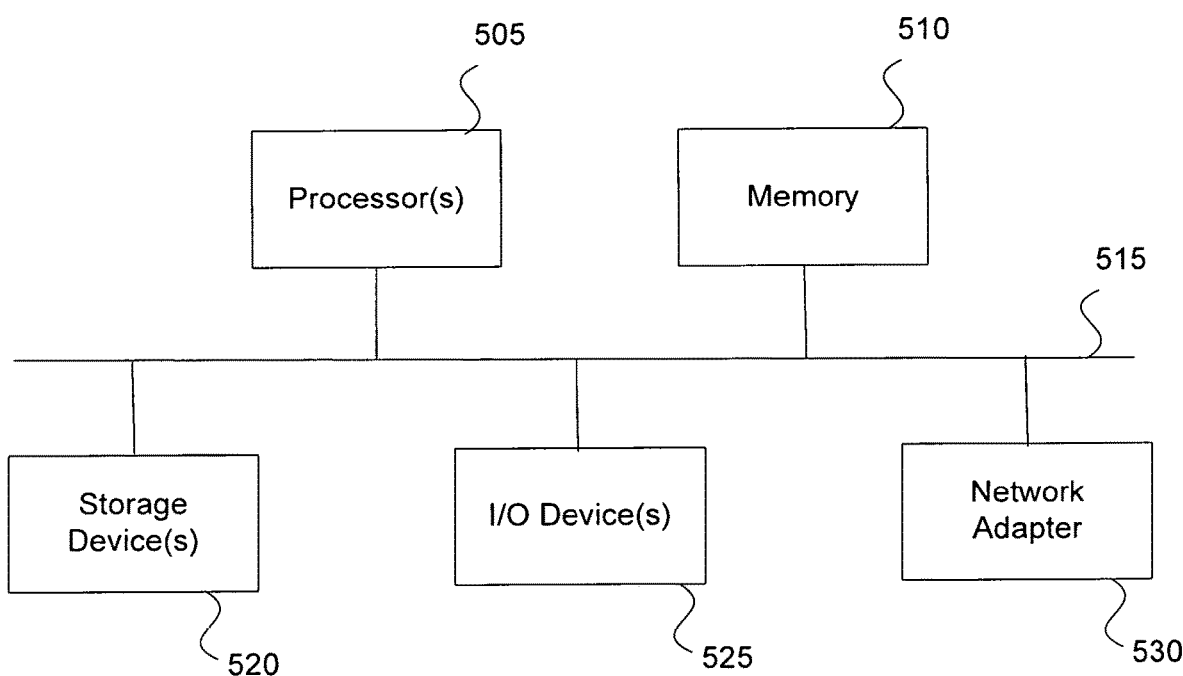
FIG. 5 is a block diagram of a computer system as may be used to implement certain features of some of the embodiments.

FIG. 5 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 500 may include one or more central processing units ("processors") 505, memory 510, input/output devices 525, e.g. keyboard and pointing devices, touch devices, display devices, storage devices 520, e.g. disk drives, and network adapters 530, e.g. network interfaces, that are connected to an interconnect 515. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 510 and storage devices 520 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer readable transmission media.

The instructions stored in memory 510 can be implemented as software and/or firmware to program the processor 505 to carry out actions described above. In some embodiments, such software or firmware may be initially provided to the processing system 500 by downloading it from a remote system through the computing system 500, e.g. via network adapter 530.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The invention claimed is:

1. A method comprising:
receiving at a file server, a request from a user device for data represented by a virtual cluster descriptor, the file server including a tiered file storage system;
querying an identifier map using an identifier of the virtual cluster descriptor; and
responsive to the identifier map indicating that the requested data is stored at a location remote from the file server:
sending a notification to the user device to cause the user device to re-request the requested data from the file server at a later time;
accessing a cold tier translation table that stores a mapping between an identifier of each of a plurality of virtual cluster descriptors and a storage location of data associated with the respective virtual cluster descriptor, wherein tiered file storage system includes a cold tier storage for data that is selected for offloading;
querying the cold tier translation table using the identifier of the virtual cluster descriptor associated with the requested data to identify a storage location of the requested data in the cold tier storage; and
loading the requested data to the file server from the identified storage location.

2. The method of claim 1, wherein:
the notification is to cause the user device to resend the request for the requested data after a delay of a specified interval of time.

3. The method of claim 1, further comprising:
identifying a set of data stored at the file server that is to be offloaded from the file server to new locations remote from the file server in the cold tier storage, the identified set of data associated with a second virtual cluster desriptor; and
updating the cold tier translation table to map an identifier of the second virtual cluster descriptor to the new locations remote from the file server.

4. The method of claim 1, wherein the identifier map stores a mapping between an identifier of a virtual cluster descriptor and a physical storage location at the file server if data corresponding to the virtual cluster descriptor is stored at the file server, and wherein the identifier map stores a mapping between the identifier of the virtual cluster descriptor and an empty location if the data corresponding to the virtual cluster descriptor is stored remotely from the file server.

5. The method of claim 1, wherein the notification is to cause the user device to re-request the requested data one or more times while the file server fetches the requested data asynchronously from the cold tier storage.

6. The method of claim 1, further comprising:
after loading the requested data to the file server from the identified storage location of the cold tier storage:
receiving, at the file server, another request from the user device for the requested data represented by the virtual cluster descriptor; and
returning the requested data from the file server to the user device in response to the another request.

7. The method of claim 1, further comprising:
responsive to the identifier map indicating that the requested data is stored locally at the file server, retrieving the requested data from the file server and providing the requested data to the user device.

8. A method comprising:
receiving, at a file server including a tiered file storage system, a request from a client for data stored at a cold tier storage location remote from the file server, wherein the cold tier storage includes data that is selected for offloading;
in response to the request, sending a notification to the client to cause the client to re-request the requested data from the file server at a later time;
accessing a cold tier translation table that stores a mapping between an identifier of each of a plurality of virtual cluster descriptors and a storage location of data associated with the respective virtual cluster descriptor;
querying the cold tier translation table using an identifier of a virtual cluster descriptor associated with the requested data to identify a storage location of the requested data in the cold tier storage; and loading the requested data to the file server from the identified storage location.

9. The method of claim 8, further comprising:
storing at the file server, an identifier map that stores a mapping between an identifier of a virtual cluster descriptor and a physical storage location at the file server if data corresponding to the virtual cluster descriptor is stored at the file server, and that stores a mapping between the identifier of the virtual cluster descriptor and an empty location if the data corresponding to the virtual cluster descriptor is stored remotely from the file server.

10. The method of claim 9, further comprising:
querying the identifier map using the identifier of the virtual cluster descriptor associated with the requested data; and
querying the cold tier translation table responsive to the identifier map indicating that the requested data is stored at a location remote from the file server.

11. The method of claim 8, wherein:
the notification is to cause the client to resend the request for the requested data after a delay of a specified interval of time.

12. The method of claim 11, wherein the notification is to cause the client to resend the request for the requested data a preset number of times.

13. The method of claim 8, further comprising:
identifying a set of data stored at the file server that is to be offloaded from the file server to new locations remote from the file server, the identified set of data associated with a second virtual cluster descriptor; and
updating the cold tier translation table to map an identifier of the second virtual cluster descriptor to the new locations remote from the file server.

14. The method of claim 8, further comprising:
after loading the requested data to the file server from the identified storage location of the cold tier storage:
receiving, at the file server, another request from the client for the requested data; and
returning the requested data from the file server to the client in response to the another request.

15. A system comprising:
a processor;
at least one machine-readable storage medium comprising instructions executable by the processor to store translation tables that map identifiers of each of a plurality of virtual cluster descriptors to a physical storage location of data corresponding to each virtual cluster descriptor; and
a file server including a tiered file storage system that includes a cold tier storage for data that is selected for offloading, wherein the file server is to:
store an identifier map;
in response to a request from a client for data represented by a virtual cluster descriptor of the plurality of virtual cluster descriptors, query the identifier map using an identifier of the virtual cluster descriptor associated with the requested data;
responsive to the identifier map indicating that the requested data is stored locally at the file server, retrieve the requested data from the file server; and
responsive to the identifier map indicating that the requested data is stored at a location remote from the file server:
send a notification to the client to cause the client to re-request the requested data from the file server at a later time;
query the cold tier translator using an identifier of a virtual cluster descriptor associated with requested data to identify a storage location of the requested data in the cold tier storage; and
load the requested data to the file server from the identified storage location.

16. The system of claim 15, wherein the instructions are executable by the processor to:
identify a set of data stored at the file server that is to be offloaded from the file server to new locations remote from the file server, the identified set of data associated with a second virtual cluster descriptor; and
update the cold tier translation table to map an identifier of the second virtual cluster descriptor to the new locations remote from the file server.

17. The system of claim 15, wherein:
the notification is to cause the user device to resend the data request after a delay of a specified interval of time.

18. The system of claim 17, wherein the notification is to cause the user device to resend the request for the requested data a preset number of times.

19. The system of claim 15, wherein the file server is further configured to:
responsive to the identifier map indicating that the requested data is stored locally at the file server, retrieve the requested data from the file server and provide the requested data to the user device.

20. The system of claim 15, wherein the file server is to:
after loading the requested data to the file server from the identified storage location of the cold tier storage:
in response to receiving another request from the client for the requested data, return the requested data from the file server to the client in response to the another request.

* * * * *